(12) United States Patent
Weller

(10) Patent No.: US 11,092,819 B2
(45) Date of Patent: Aug. 17, 2021

(54) FULL DISPLAY MIRROR WITH ACCOMMODATION CORRECTION

(71) Applicant: Gentex Corporation, Zeeland, MI (US)

(72) Inventor: Andrew D. Weller, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 314 days.

(21) Appl. No.: 16/143,903

(22) Filed: Sep. 27, 2018

(65) Prior Publication Data

US 2019/0094560 A1 Mar. 28, 2019

Related U.S. Application Data

(60) Provisional application No. 62/563,914, filed on Sep. 27, 2017.

(51) Int. Cl.
| | |
|---|---|
| G02B 27/01 | (2006.01) |
| H04N 13/305 | (2018.01) |
| G02B 30/27 | (2020.01) |
| H04N 13/351 | (2018.01) |
| B60R 1/00 | (2006.01) |

(Continued)

(52) U.S. Cl.
CPC ............... G02B 30/27 (2020.01); B60R 1/00 (2013.01); G02B 27/0101 (2013.01); G02B 30/26 (2020.01); H04N 13/305 (2018.05); H04N 13/346 (2018.05); H04N 13/351 (2018.05); *B60R 2300/20* (2013.01); *G02B 2027/0138* (2013.01)

(58) Field of Classification Search
CPC ............... G02B 27/01; G02B 27/00; G02B 2027/0112; G02B 2027/0138; G02B 2027/014; G02B 2027/0183
See application file for complete search history.

(56) References Cited

U.S. PATENT DOCUMENTS

| | | | |
|---|---|---|---|
| 5,414,461 | A | 5/1995 | Kishi et al. |
| 6,377,295 | B1 | 4/2002 | Woodgate et al. |
| 6,501,536 | B1 | 12/2002 | Fredricks |

(Continued)

FOREIGN PATENT DOCUMENTS

| | | |
|---|---|---|
| CN | 105549315 A | 5/2016 |
| DE | 102005001973 A1 | 7/2006 |

(Continued)

OTHER PUBLICATIONS

Extended European Search Report dated Jun. 19, 2020, for corresponding EP application No. 18 86 0167, 6 pages.

(Continued)

*Primary Examiner* — William C. Dowling
(74) *Attorney, Agent, or Firm* — Price Heneveld LLP; Bradley D. Johnson

(57) ABSTRACT

The disclosure provides for a display apparatus for a vehicle. The display apparatus includes a display screen configured to emit images in an emission direction; a mirror apparatus configured to reflect the images from the display screen towards a viewing direction; and a lens apparatus configured to receive the images from the mirror, wherein the lens apparatus is configured to project the images to a focal distance substantially opposite the viewing direction, wherein the focal distance is positioned at least about 750 mm from eyes of the driver.

20 Claims, 9 Drawing Sheets

(51) Int. Cl.
*H04N 13/346* (2018.01)
*G02B 30/26* (2020.01)

(56) References Cited

U.S. PATENT DOCUMENTS

| | | |
|---|---|---|
| 6,572,233 B1 | 6/2003 | Northman et al. |
| 8,237,909 B2 | 8/2012 | Ostreko et al. |
| 8,339,526 B2 | 12/2012 | Minikey, Jr. et al. |
| 8,411,245 B2 | 4/2013 | Lee et al. |
| 8,947,605 B2 | 2/2015 | Eichenlaub |
| 9,179,134 B2 | 11/2015 | Ranieri et al. |
| 2006/0132914 A1 | 6/2006 | Weiss et al. |
| 2007/0008620 A1 | 1/2007 | Shestak et al. |
| 2007/0035694 A1 | 2/2007 | Keller |
| 2008/0068520 A1 | 3/2008 | Minikey, Jr. et al. |
| 2008/0161997 A1 | 7/2008 | Wengelnik et al. |
| 2009/0002394 A1 | 1/2009 | Chen et al. |
| 2009/0096937 A1 | 4/2009 | Bauer et al. |
| 2009/0282429 A1 | 11/2009 | Olsson et al. |
| 2010/0149317 A1 | 6/2010 | Matthews |
| 2010/0164702 A1* | 7/2010 | Sasaki .............. G01B 21/22 340/438 |
| 2010/0201816 A1 | 8/2010 | Lee et al. |
| 2011/0228211 A1 | 9/2011 | Waters |
| 2012/0092329 A1 | 4/2012 | Koo et al. |
| 2012/0229367 A1 | 9/2012 | Magyari |
| 2013/0033593 A1 | 2/2013 | Chinnock et al. |
| 2013/0113786 A1 | 5/2013 | King |
| 2013/0127608 A1 | 5/2013 | Ishikawa et al. |
| 2013/0342913 A1 | 12/2013 | Tsimhoni et al. |
| 2014/0111854 A1 | 4/2014 | Kroon et al. |
| 2014/0114534 A1 | 4/2014 | Zhang et al. |
| 2014/0125783 A1 | 5/2014 | Chung et al. |
| 2014/0320856 A1 | 10/2014 | Foley |
| 2014/0327771 A1 | 11/2014 | Malachowsky et al. |
| 2015/0077826 A1 | 3/2015 | Beckman |
| 2015/0232030 A1 | 8/2015 | Bongwald |
| 2015/0235409 A1 | 8/2015 | Grossman et al. |
| 2015/0245017 A1 | 8/2015 | Di Censo et al. |
| 2015/0283902 A1 | 10/2015 | Tuukkanen |
| 2015/0319423 A1 | 11/2015 | Kim et al. |
| 2015/0334379 A1 | 11/2015 | Du et al. |
| 2016/0042501 A1 | 2/2016 | Huang et al. |
| 2016/0182877 A1 | 6/2016 | Deluca |
| 2016/0202479 A1 | 7/2016 | Okayama |
| 2016/0209647 A1 | 7/2016 | Fursich |
| 2017/0078468 A1 | 3/2017 | Cho et al. |
| 2017/0240112 A1 | 8/2017 | Chen |
| 2017/0302913 A1* | 10/2017 | Tonar ................... B60K 35/00 |
| 2018/0232866 A1* | 8/2018 | Weller ................. G09G 3/001 |

FOREIGN PATENT DOCUMENTS

| | | |
|---|---|---|
| DE | 102014205519 A1 | 10/2015 |
| EP | 0602934 B1 | 3/1999 |
| EP | 2251227 A2 | 11/2010 |
| JP | 5139209 A | 6/1993 |
| JP | 7140416 A | 6/1995 |
| WO | 200800289 W | 1/2008 |
| WO | 2015168464 A1 | 11/2015 |
| WO | 2016170191 W | 10/2016 |

OTHER PUBLICATIONS

Gotoda, Hironobu, "A Multilayer Display Augmented by Alternating Layers of Lenticular Sheets," Stereoscopic Displays and Applications XXV, SPIE vol. 9011, 2014, 8 pages.

Huang, Fu-Chung et al., "Eyeglasses-free Display: Towards Correcting Visual Aberrations with Computational Light Field Displays," Siggraph, 2014, pp. 1-12.

Huang, Fu-Chung et al., "Correcting for Optical Aberrations Using Multilayer Displays," ACM Transactions on Graphics, vol. 31, No. 6, 2012, 12 pages.

Pamplona, Vitor F. et al., "Tailored Displays to Compensate for Visual Aberrations," Siggraph 2012, pp. 1-12.

Office Action in Japanese dated May 10, 2021, for corresponding Japanese application No. 2020-517800, 4 pages.

* cited by examiner

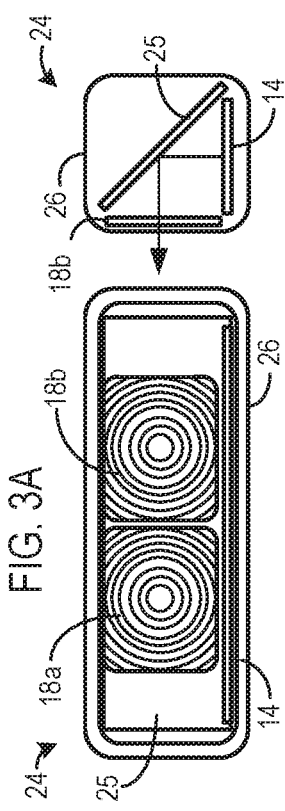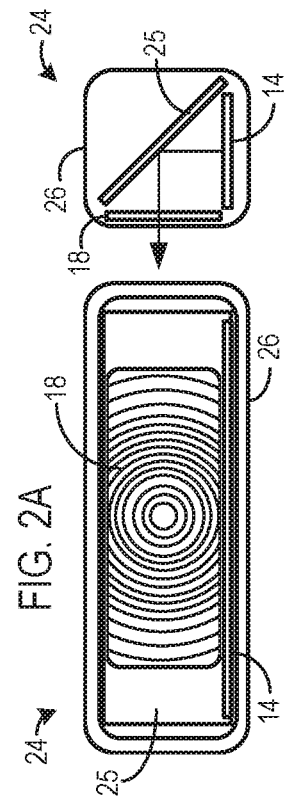

FULL DISPLAY MIRROR WITH ACCOMMODATION CORRECTION

CROSS-REFERENCE TO RELATED APPLICATION

This application claims priority to and the benefit under 35 U.S.C. § 119(e) of U.S. Provisional Patent Application No. 62/563,914, filed on Sep. 27, 2017, entitled "FULL DISPLAY MIRROR WITH ACCOMMODATION CORRECTION," by Andrew D. Weller, the entire disclosure of which is incorporated herein by reference.

TECHNOLOGICAL FIELD

The present invention generally relates to display devices for vehicles and more particularly to display devices configured to generate image data for ease of viewing a vehicular display.

SUMMARY OF THE DISCLOSURE

According to one aspect of the present disclosure, a display apparatus for a vehicle is provided for displaying images captured by at least one image sensor to a driver of the vehicle. The display apparatus comprises a display screen configured to emit the images in an emission direction; a mirror apparatus configured to reflect the images from the display screen towards a viewing direction; and a lens apparatus configured to receive the images from the mirror, wherein the lens apparatus is configured to project the images to a focal distance substantially opposite the viewing direction, wherein the focal distance is positioned at least about 750 mm from the eyes of the driver.

According to another aspect of the present disclosure, a display apparatus for a vehicle is provided for displaying images captured by at least one image sensor to a driver of the vehicle. The display apparatus comprises a first display screen configured to emit first images in a first emission direction; a second display screen configured to emit second images in a second emission direction; a mirror apparatus positioned to reflect the first and second images from the first and second display screens toward a viewing direction; a first lens apparatus configured to receive the first images from the mirror, wherein the first lens apparatus is configured to project the first images to a focal distance substantially opposite the viewing direction; and a second lens apparatus configured to receive the second images from the mirror, wherein the second lens apparatus is configured to project the second images to the focal distance substantially opposite the viewing direction.

According to another aspect of the present disclosure, a display apparatus for a vehicle is provided for displaying images captured by at least one image sensor to a driver of the vehicle. The display apparatus comprises a display screen configured to emit the images in an emission direction; a mirror apparatus positioned to reflect the images from the display screen towards a viewing direction; and a lens apparatus configured to receive the images from the mirror, wherein the lens apparatus is configured to project the images to a focal distance substantially opposite the viewing direction, wherein the focal distance is positioned at least about 115 mm from the lens apparatus.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 2A is a front elevational view of a rearview assembly incorporating a display apparatus of the display system of FIG. 1;

FIG. 2B is a cross-sectional plan view of the rearview assembly of FIG. 2A;

FIG. 2C is a cross-sectional side view of the rearview assembly of FIGS. 2A and 2B;

FIG. 3A is a front elevational view of a variation of the rearview assembly of FIG. 2A;

FIG. 3B is a cross-sectional plan view of the rearview assembly of FIG. 3A;

FIG. 3C is a cross-sectional side view of the rearview assembly of FIGS. 3A and 3B;

FIG. 4A is a front elevational view of a variation of the rearview assembly of FIG. 3A;

FIG. 4B is a cross-sectional plan view of the rearview assembly of FIG. 4A;

FIG. 4C is a cross-sectional side view of the rearview assembly of FIGS. 4A and 4B;

DETAILED DESCRIPTION

Figure 1:
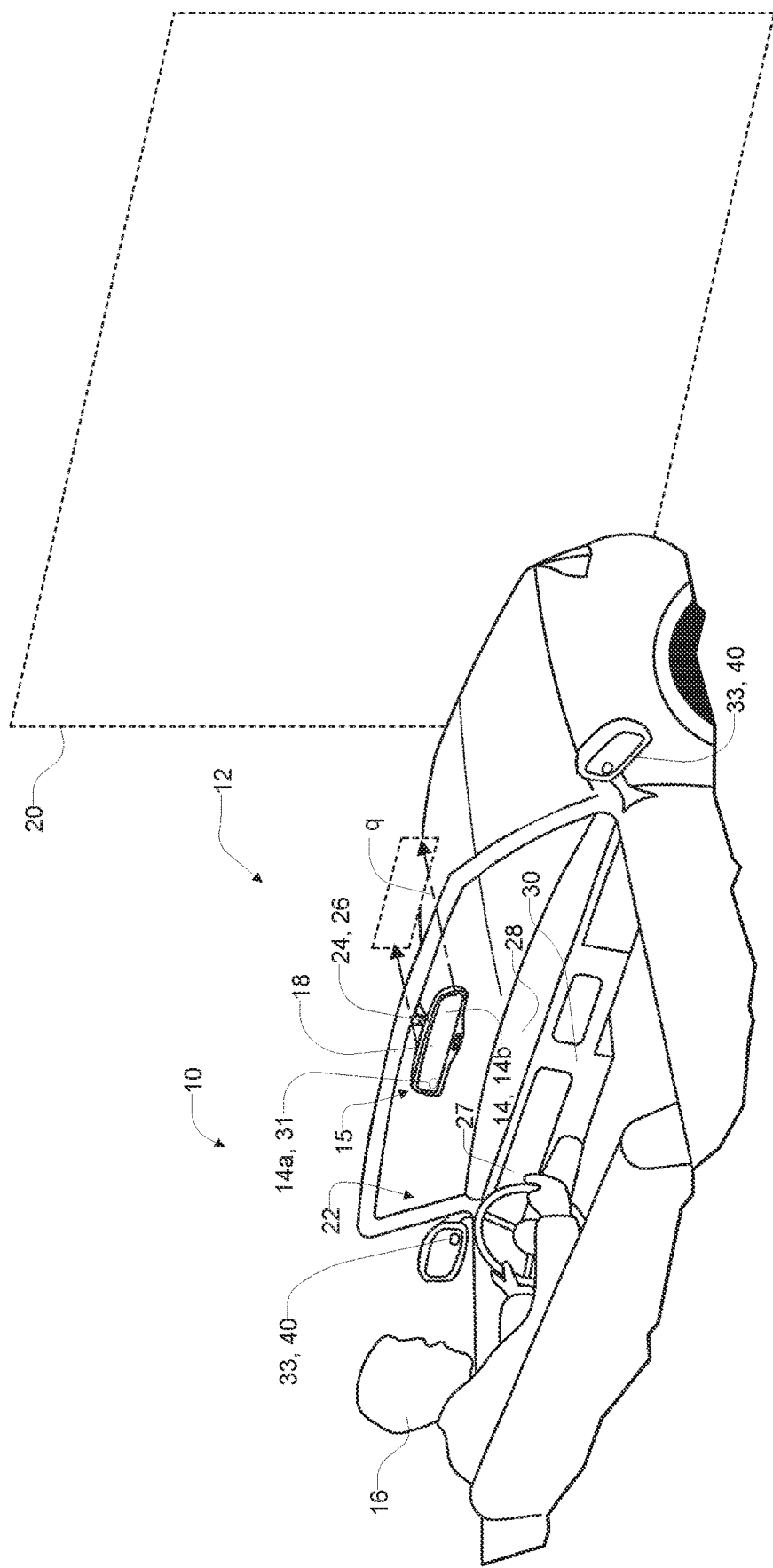
FIG. 1 is projected view demonstrating a display system of a vehicle.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of a display, and the term "rear" shall refer to the surface of the element further from the intended viewer of the display. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIG. 1, the disclosure provides for a display system 10 for a vehicle 12. The display system 10 may be operable to display image data on a display screen 14. In some embodiments, the display system 10 may comprise a focal distance correction feature 15 configured to adjust an apparent focal distance of the image data on the display screen 14 relative to an occupant 16 of the vehicle 12. The focal distance correction feature 15 may provide for relief of one or more forms of ocular strain, blurriness, and/or other various issues that may be associated with visual accommodation. In this way, the display system 10 provides for an improved viewing experience of the display screen 14.

Visual accommodation is the process by which eyes focus on objects at various distances. For example, accommodation occurs when changing focus from a nearby object (e.g. the display screen 14) to a far off object in a distant region 20. The amplitude or effective accommodation of humans typically declines with age and may further be complicated by various additional visual irregularities. For example, various visual disorders including, but not limited to latent hyperopia, myopia, presbyopia, and pseudomyopia, may be related to or have adverse effects that can further exacerbate issues with accommodation. Some of these visual disorders may be treated with corrective lenses, but such treatments may further compound the issues related to accommodation. In order to limit the visual strain related to accommodation and related issues, the disclosure provides for the focal distance correction feature 15 configured to adjust the apparent focal distance of the display screen 14.

As demonstrated in FIG. 1, the display screen 14 may be located in a passenger compartment 22 of the vehicle 12 nearby the occupant 16. Accordingly, one or more issues in accommodation may be apparent when the occupant 16 adjusts focal distance from the nearby display screen 14 to a distant region 20 away from the vehicle 12. For example, one or more images shown on the display screen 14 of the display system 10 may appear blurred when viewed after looking at the distant region 20. Such issues may not typically be associated with conventional rearview mirrors (e.g. reflective mirrors without video displays) because the objects in the mirror appear to have a similar focal distance to objects in the distant region 20.

Difficulties adjusting between the distant region 20 and nearby objects in the passenger compartment 22 may be more prevalent for older operators (e.g. the occupant 16) of the vehicle 12. Due to a gradual loss of accommodation, older individuals may commonly have greater difficultly changing focus from the distant region 20 to nearby objects (e.g. objects in the passenger compartment 22). As discussed herein, nearby objects may correspond to objects less than 750 mm from the occupant 16 (e.g. the display screen 14). The distant region 20 may correspond to distances greater than 2 m from the occupant 16. Accordingly, the occupant 16 may face challenges of eye strain as well as magnification correction when viewing nearby objects in the passenger compartment 22 while operating the vehicle 12.

The disclosure may provide for the display system 10 incorporating a focal distance correction feature 15 to limit a difference in focal distance between the display screen 14 and one or more of far off objects in the distant region 20. In this way, the display system 10 may provide for improved visibility of a scene rearward from the vehicle 12 and limit eye strain that may otherwise result from adjustment or accommodation in focal distance from the display screen 14 to the distant region 20.

As discussed herein, the display system 10 may be configured to capture and display image data on the display screen 14. The image data may correspond to one or more scenes that may typically be visible in a rearview mirror. In some embodiments, the display system 10 may provide for the display of panoramic image data captured by one or more cameras or imaging devices on the display screen 14. Accordingly, the disclosure provides for various embodiments of the display system, some of which are described in detail in the following description.

Still referring to FIG. 1, in some embodiments, the disclosure may provide for the display system 10 to generate and display augmented image data on the display screen 14. The augmented image data may be configured to be emitted or projected from the display screen 14 to provide occupant 16 with the perception that image data is projected behind the display screen and/or in front of the vehicle 12. The augmented image data may be restructured (e.g. stretched, elongated, manipulated, etc.) and projected through a lens apparatus 18 or lens array in connection with the display screen 14 in order to provide the perception of originating from behind the display screen 14. In some embodiments, a projection distance q of the image data may be provided by the restructured or augmented image data emitted from the display screen 14 and passing through the lens apparatus 18 (e.g. one or more lenses, lens arrays, lenticular lenses, etc.).

The augmented image data projected through the lens apparatus 18 may be visually perceived by the occupant 16 at the projected distance q due to a focal point and/or magnification of the lens apparatus 18 projecting the perceived focal depth behind the display screen 14. For example, the lens apparatus 18 may be configured to adjust the focal depth of the display screen 14 such that a vergence angle of the binocular vision of the occupant 16 is expanded or increased to appear further away from the occupant 16 at the projected distance q. In various embodiments, the image data may also be augmented by the display system 10 to correct for distortion attributed to viewing the image data through the lens apparatus 18. In this way, the system 10 may provide for an improved viewing experience of the image data on the display screen 14 by projecting the perceived distance of the image data to the projected distance q.

FIGS. 2A-2C show an example of one implementation of a display apparatus 24. In this implementation, the display apparatus 24 is provided in an interior rearview assembly 26. Because the size of a housing of the rearview assembly 26 is not very large, it can be difficult to provide an object within the rearview assembly housing at a distance from the lens apparatus 18 sufficient to result in a projection of sufficient distance q to correct for accommodation. Accordingly, the display apparatus 24 may further include a mirror apparatus such as a mirror 25 positioned between the lens apparatus 18 and the display screen 14 and the display screen 14 may be disposed in a plane perpendicular to the lens apparatus 18. This provides a folded optical path that allows the display screen 14 to be positioned sufficiently far from the lens apparatus 18 such that the lens apparatus 18 may focus the image of the display screen 14 at an adequate distance q. In this implementation, the lens apparatus 18 may have a focal length of about 115 mm and a lens diameter of about 115 mm. With the configuration shown in FIGS. 2A-2C, the optical path is about 80 mm and the virtual image appears at a distance q of 125 mm from the lens apparatus 18, which represents a total distance from the eyes of the occupant 16 of about 750 mm (assuming a distance of about 500 mm from the eyes of the occupant 16 to the lens apparatus 18).

As discussed further in reference to FIGS. 3A-3C, 4A-4C, and 6-8, the display system 10 may be configured to capture and display the image data or augmented image data on the display screen 14. The image data may comprise image data in the form of right eye image data or frames and left eye image data or frames. The right eye image data may be transmitted from the display screen 14 such that it is received by the right eye of the occupant 16. The left eye image data may be transmitted from the display screen 14 such that it is received by the left eye of the occupant 16. Accordingly, the display screen 14 may form a portion of a display apparatus 24 configured to project specific frames of the image data to each of the left eye and the right eye of the occupant 16.

FIGS. 3A-3C show an example of another implementation of a display apparatus 24. In this implementation, the display apparatus 24 includes two lens apparatuses 18a and 18b rather than a single lens apparatus as in the implementation in FIGS. 2A-2C. By using two smaller lenses and shorter focal lengths than a mirror-sized lens would provide given the same packaging constraints, a larger viewing area may be achieved. Both of the driver's eyes see content through both lenses 18a and 18b, and the lenses are paired together to provide the driver a single (interpreted) complete image through both eyes, simultaneously. In this implementation, each lens apparatuses 18, 18a may have a focal length of about 115 mm and a lens diameter of about 75 mm. With the configuration shown in FIGS. 3A-3C, the optical path is about 80 mm and the virtual image appears at a distance q of 125 mm from the lens apparatus 18, which represents a total distance from the eyes of the occupant 16 of about 750 mm.

FIGS. 4A-4C show an example of another implementation of a display apparatus 24. In this implementation, the display apparatus 24 includes two lens apparatuses 18a and 18b. This implementation further includes two separate display screens 14a and 14b disposed on opposite ends of the rearview assembly housing and a mirror apparatus including two mirrors 25a and 25b for reflecting respective images from display screens 14a and 14b towards respective lens apparatuses 18a and 18b. The image to be viewed by the driver is split in half with each half displayed by a respective one of the display screens 14a and 14b to provide the driver a single (interpreted) complete image through both eyes, simultaneously. In this implementation, each lens apparatuses 18, 18a may have a focal length of about 115 mm and a lens diameter of about 75 mm. With the configuration shown in FIGS. 4A-4C, the optical path is about 80 mm and the virtual image appears at a distance q of 125 mm from the lens apparatus 18, which represents a total distance from the eyes of the occupant 16 of about 750 mm.

Figure 10A:
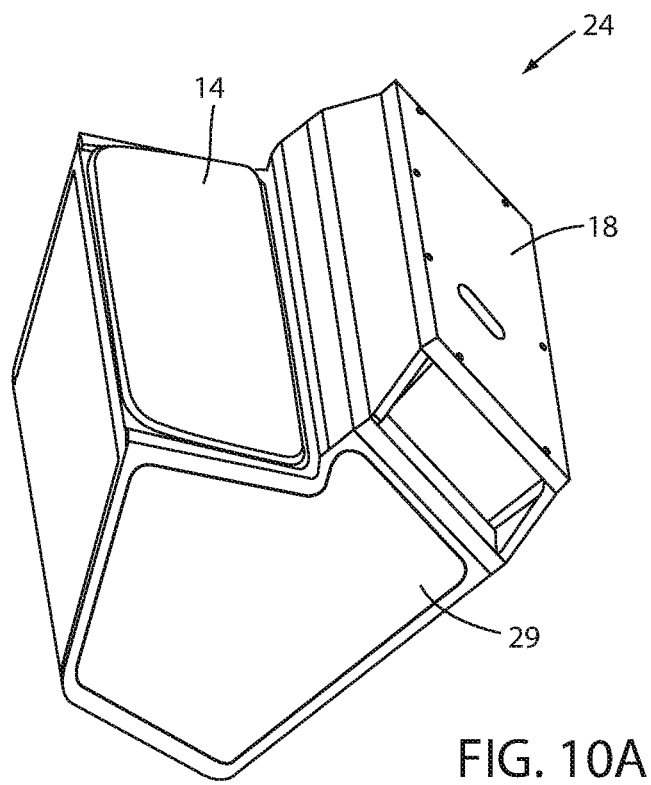
FIG. 10A is a perspective view of another implementation of a display apparatus of the display system of FIG. 1.
Figure 10B:
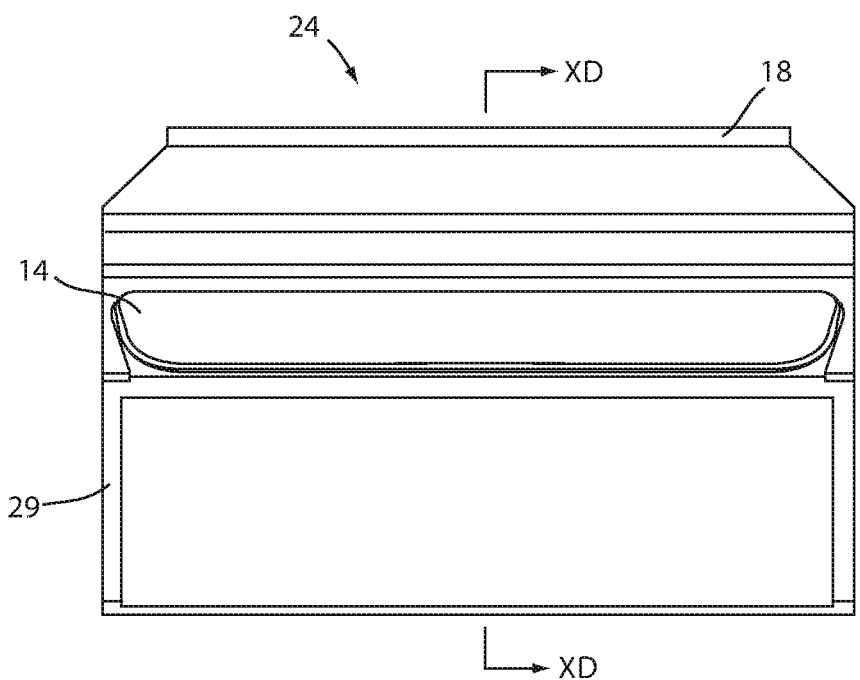
FIG. 10B is a front elevational view of the display apparatus of FIG. 10A.
Figure 10C:
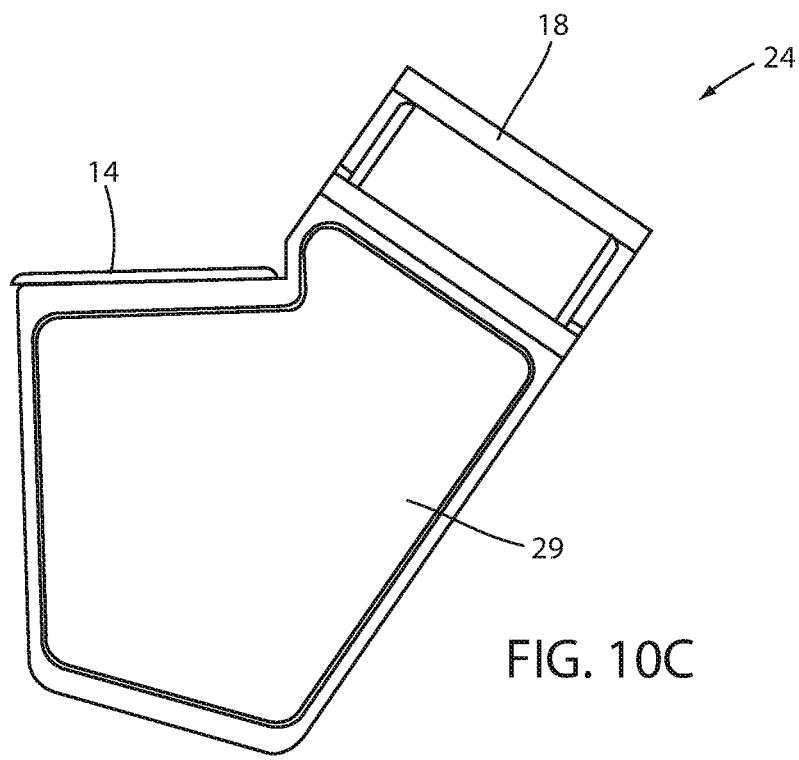
FIG. 10C is a side elevational view of the display apparatus of FIGS. 10A and 10B.
Figure 10D:
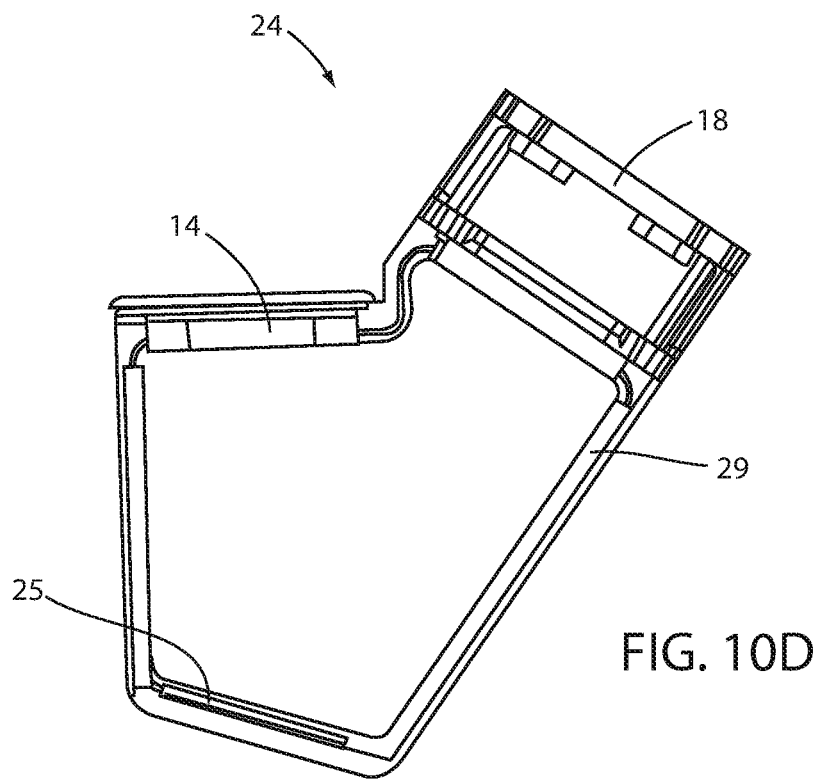
FIG. 10D is cross-sectional side view of the display apparatus of FIGS. 10A-10C taken along line XA-XA in FIG. 10B.

FIGS. 10A-10D show an example of another implementation of a display apparatus 24. Like the other implementations, in this implementation, the display apparatus 24 includes a display screen 14, a lens apparatus 18, and a mirror apparatus including a mirror 25 (FIG. 10D). Unlike the other implementations, the display screen 14 is positioned in a first plane that is not substantially orthogonal to a second plane in which the lens apparatus 18 is positioned and the emission direction of the display screen 14 is not orthogonal to the viewing direction. The display screen 14, lens apparatus 18, and the mirror 25 are disposed in a housing 29. The lens apparatus 18 is configured for mounting either directly to or proximate to the inside surface of a windshield of the vehicle. Thus, the housing 29 is configured such that the lens apparatus 18 has an outer surface that is substantially parallel to the inside surface of the windshield. This implementation differs in that it uses a lens with a 330 mm focal length. With the configuration shown in FIGS. 10A-10D, the optical path is about 250 mm and the virtual image appears at a distance q of 900 to 1000 mm from the lens apparatus 18, which represents a total distance from the eyes of the occupant 16 of about 1500 mm. By further reducing the size of the display screen 14 and reducing the focal length of the lens apparatus 18 to about 250 mm in the implementation of FIGS. 10A-10D, a virtual image may be projected at a distance q of 1500 mm from the lens apparatus 18, which represents a total distance from the eyes of the occupant 16 of about 2000 mm.

In the above implementations of the display apparatus 24, the mirrors 25, 25a, 25b are flat mirrors that may have a reflective coating on the surface facing the display screen(s) 14, 14a, 14b. However, the mirrors could also be curved to help facilitate select optical goals within the display system 10, such as (but not limited to) offsetting spherical aberrations within the lens, or altering the height, width or magnification of the generated virtual image.

The lens apparatuses 18, 18a, 18b are shown as being Fresnel lenses. However, the lens apparatus may be a cylindrical lens or a lenticular lens. The implementations with multiple lens apparatuses and/or display screens may utilize image manipulation (or stitching) in order for the occupant to see a complete scene.

In the implementations shown, the optical path length from the display screens 14, 14a, 14b to the lens apparatuses 18, 18a, 18b is substantially the same from each pixel of the display screens 14, 14a, 14b. This ensures clarity of the projected image.

In some embodiments, the lens apparatus 18 may comprise a neutral display region 31 configured to transmit the image data from the display screen 14 and/or icons or elements incorporated in the display apparatus 24. The neutral display region 31 may correspond to an area, region, or zone of the lens apparatus 18 configured to transmit light (e.g. the image data) without optical correction. In this configuration, the image data emitted from the display screen 14 may be transmitted through the neutral display region 31 allowing the corresponding image data to "pass through" without substantial magnification or adjustment to the focal point such that the image data in the neutral display region 31 appears to originate from the display screen 14. That is, the neutral display region 31 may provide for a first portion 14a of the display screen configured to display visual information that appears to be located on a plane formed by a surface of the lens apparatus 18 and a second portion 14b configured to display visual information that appears to originate from the projected distance q.

The neutral display region 31 may provide for the display screen to provide for one or more soft keys, which may be displayed on the display screen 14 as buttons, icons, graphics and/or text in the plane of the display screen 14. For example, in some embodiments, the display apparatus 24 may comprise a user interface comprising a sensory grid or touchscreen functionality. The user interface may be utilized in combination with the soft keys transmitted through the neutral display region 31 to provide for a human-machine interface (HMI). In this configuration, the display apparatus 24 may provide for the soft keys, buttons, text, or graphics to appear as though they originate from the display screen 14 through the neutral display region 31. Further discussion regarding the user interface is discussed in reference to FIG. 9.

In some embodiments, the neutral display region 31 may be configured as a switchable optical correction mechanism, which may be referred to as a selective or switchable neutral display region. In this configuration, the switchable neutral display region may comprise a liquid crystal display (LCD) or various electro-optic elements that may be controlled by the system 10 to facilitate an "on demand" focal change feature. Accordingly, in a first configuration, the switchable neutral display region may shift or apply a correction to the image data emitted from the display screen 14 such that the image data appears to originate from the projected distance q. Additionally, in a second configuration, the switchable neutral display region may function as the neutral display region 31 allowing the corresponding image data to "pass through" without substantial magnification or adjustment to the focal point such that the image data in the neutral display region 31 appears to originate from the display screen 14.

According to various embodiments, the display apparatus 24 may comprise similar features to an autostereoscopic or automultiscopic display. The following references may include various implementations for display systems and camera systems configured to provide for autostereoscopic and/or automultiscopic functionality and are incorporated herein by reference in their entirety: U.S. Pat. No. 9,179,134 B2, entitled "MULTI-LAYER PLENOPTIC DISPLAYS THAT COMBINE MULTIPLE EMISSIVE AND LIGHT MODULATING PLANES," filed Nov. 27, 2012, by Ranieri et al.; U.S. Publication No. 2015/0334379 A1, entitled "DISPLAY UNIT FOR ROTATABLY DISPLAYING AN AUTOSTEREOSCOPIC PRESENTATION," filed Jun. 23, 2015, by Du et al.; U.S. Pat. No. 6,377,295 B1, entitled "OBSERVER TRACKING DIRECTIONAL DISPLAY," filed Aug. 12, 1997, by Woodgate et al.; U.S. Publication No. 2015/0319423 A1, entitled "MULTI-PERSPECTIVE STEREOSCOPY FROM LIGHT FIELDS," filed Jul. 15, 2015, by Kim et al.; U.S. Publication No. 2014/0125783 A1, entitled "AUTOSTEREOSCOPIC IMAGE DISPLAY AND METHOD FOR DRIVING THE SAME," filed Nov. 6, 2013, by Chung et al.; U.S. Pat. No. 8,947,605 B2, entitled "IMAGE DATA PLACEMENT METHOD FOR A TIME MULTIPLEXED AUTOSTEREOSCOPIC DISPLAY," filed May 25, 2012, by Eichenlaub; and U.S. Publication No. 2009/0282429 A1, entitled "VIEWER TRACKING FOR DISPLAYING THREE DIMENSIONAL VIEWS," filed May 7, 2008, by Olsson et al.

As discussed herein, the display system 10 may be configured to generate separate images for the right eye and the left eye of the occupant 16. Additionally, the display system 10 may be configured to generate a plurality of views that may be associated with a plurality of image sensors. Embodiments of the display system 10 configured to provide for a plurality of views may utilize one or more stereoscopic display methods to communicate the image data to the left eye and the right eye independently. In this configuration, the display apparatus 24 may provide for views that may normally be shown on a rearview mirror and conventional side mirrors.

In some embodiments, the display apparatus may be configured to track the position of the occupant 16 in the passenger compartment 22. For example, the display apparatus 24 may comprise a sensor configured to track a location of a face and/or the eyes of the occupant 16. In this way, the display apparatus 24 may be operable to track a position of the eyes of the occupant 16 to control specific pixels in a pixel array configured to target the left eye or the right eye. The eyes of the operator may be tracked by one or more tracking sensors that may be incorporated in a display apparatus 24. An example of a tracking sensor is discussed further in reference to FIG. 9.

In an exemplary embodiment, the display apparatus 24 of the display system 10 may be incorporated in an interior rearview assembly 26. The display apparatus 24 may be mounted or otherwise attached to a vehicle 12 in a variety of locations. For example, the display apparatus 24 may be integrated into a gauge cluster 27, a dashboard 28, a center stack 30 (e.g., infotainment center), side mirrors, and/or a headliner of the vehicle 12. The display apparatus 24 may be located in other peripheral locations. For example, the display apparatus 24 may be mounted to a visor. The display apparatus 24 may be mounted to other surfaces of a vehicle 12 (e.g. windshield, door panel, or other vehicle components).

Figure 5:
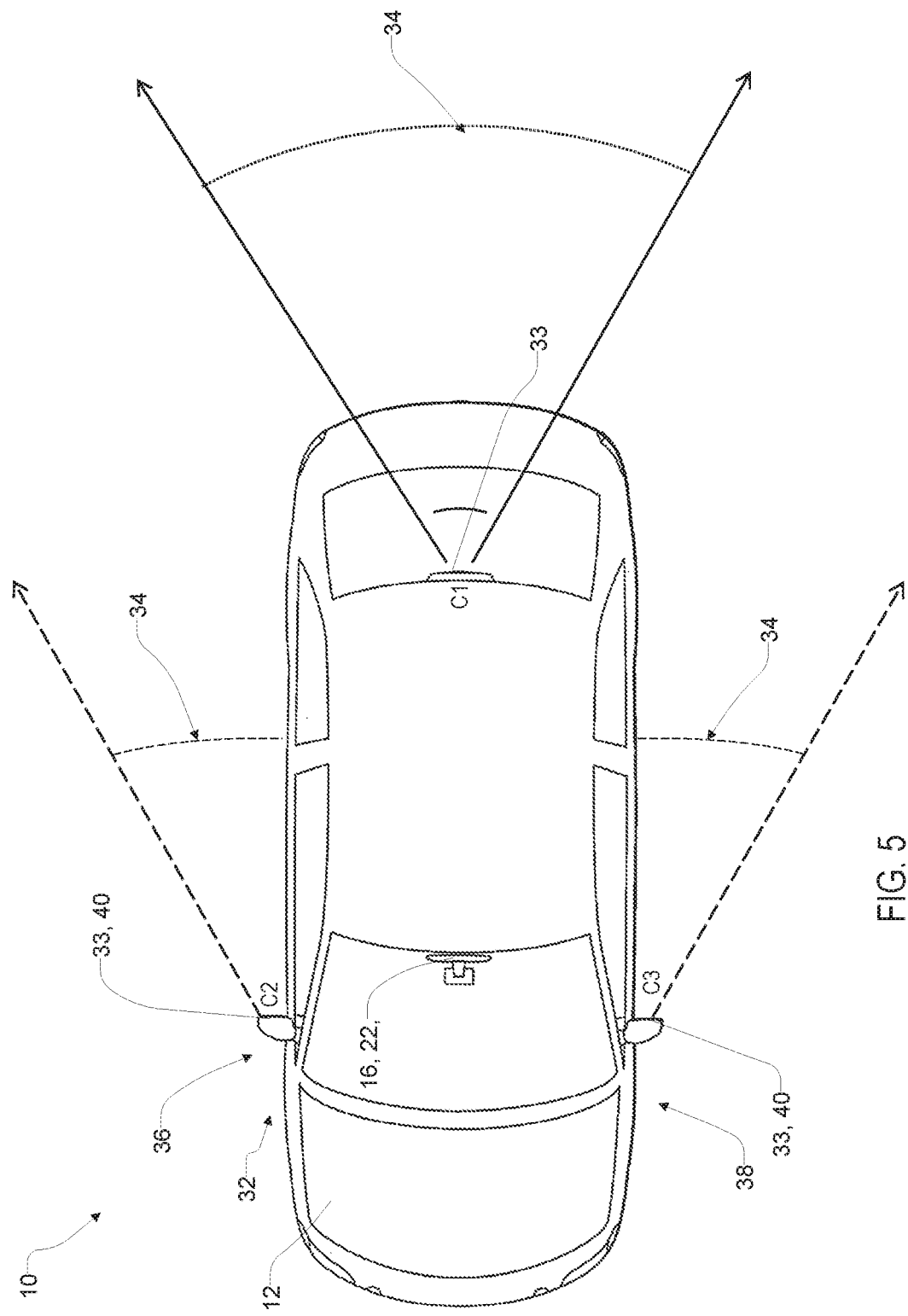
FIG. 5 is an elevational view of a vehicle demonstrating an imaging apparatus of a vehicle.

Referring now to FIG. 5, a diagram of an imaging apparatus 32 of the vehicle 12 is shown. In an exemplary embodiment, a plurality of image sensors 33 of the imaging apparatus 32 may correspond to a first image sensor C1, a second image sensor C2, and a third image sensor C3. Each of the image sensors 33 may have a field of view 34 focusing on an environment proximate the vehicle 12. In the various implementations discussed herein, the image sensors C1-C3 may be implemented to provide views of the environment proximate the vehicle 12 that may be displayed on the display screen 14 or any form of display device.

The image sensors 33 may be arranged in various locations on the vehicle 12. In an exemplary embodiment, the image sensors 33 may be arranged such that each of a plurality of fields of view 34 of the image sensors C1-C3 is configured to capture a significantly different portion of the surrounding environment. Each of the image sensors 33 may comprise any form of device configured to capture image data, for example Charge Coupled Device (CCD) and Complementary Metal Oxide Semiconductor (CMOS) image sensors. Though three image sensors C1, C2, and C3 are discussed in reference to the present implementation, the number of image sensors may vary based on the specifications of the particular image sensors and/or a desired number of fields of view 34 for the display system 10.

The image sensors C1, C2, and C3 are disposed on the vehicle 12 and oriented such that each field of view 34 of the image sensors 33 is directed toward a substantially different region. A first image sensor C1 may be disposed centrally on a rear facing portion of the vehicle 12 proximate a tailgate or similar area of the vehicle 12. In some embodiments, the image sensor C1 may be disposed proximate a rear bumper and/or a center high mount stop light (CHMSL). A second image sensor C2 and a third image sensor C3 may be disposed on a passenger's side 36 and a driver's side 38 of the vehicle 12, respectively. The second image sensor C2 and the third image sensor C3 may be configured to capture image data corresponding to the environment proximate the side regions of the vehicle 12.

In some implementations, the second image sensor C2 and the third image sensor C3 may be disposed in side mirrors 40 of the vehicle 12. The image sensors C2 and C3, in combination with the first image sensor C1, may be configured to capture image data corresponding to a rearward-directed region relative the forward direction of the vehicle 12. In some embodiments, the image sensors 33 may be configured to capture an increased or decreased viewing angle depending on the particular application. In some embodiments, the image sensors may be configured to capture approximately the entire environment surrounding the vehicle 12.

Figure 6:
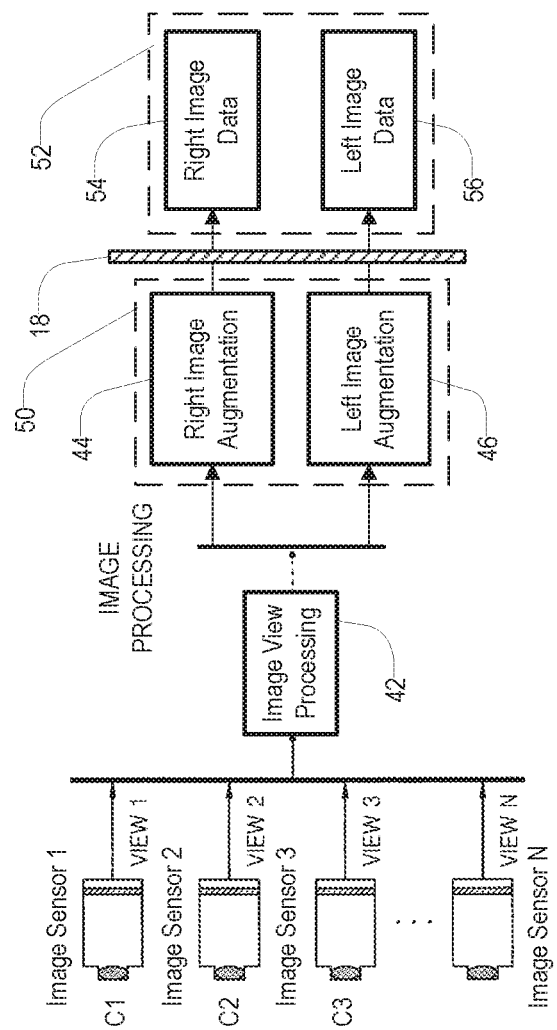
FIG. 6 is a block diagram of an image processing method for generating augmented image data.

As discussed further in reference to FIG. 6, the image sensors 33 may be in communication with the image processor configured to process image data from each of the fields of view 34 captured by the image sensors 33. The image processor may be configured to generate augmented image data from the fields of view 34 for each of the right eye and the left eye of the occupant 16. In this configuration, the display system 10 may provide for an enhanced viewing experience by controlling the image data to provide a visual perception for the occupant that the image data originates from behind the display screen 24 at a projected distance q. Though discussed in detail in reference to the interior rearview assembly 26, the display system 10 may be utilized in various portions of the vehicle (e.g. a vehicle console, gage cluster, side mirrors, etc.). As such, the disclosure provides for various embodiments of vehicle displays that may be utilized for a variety of applications.

Figure 7:
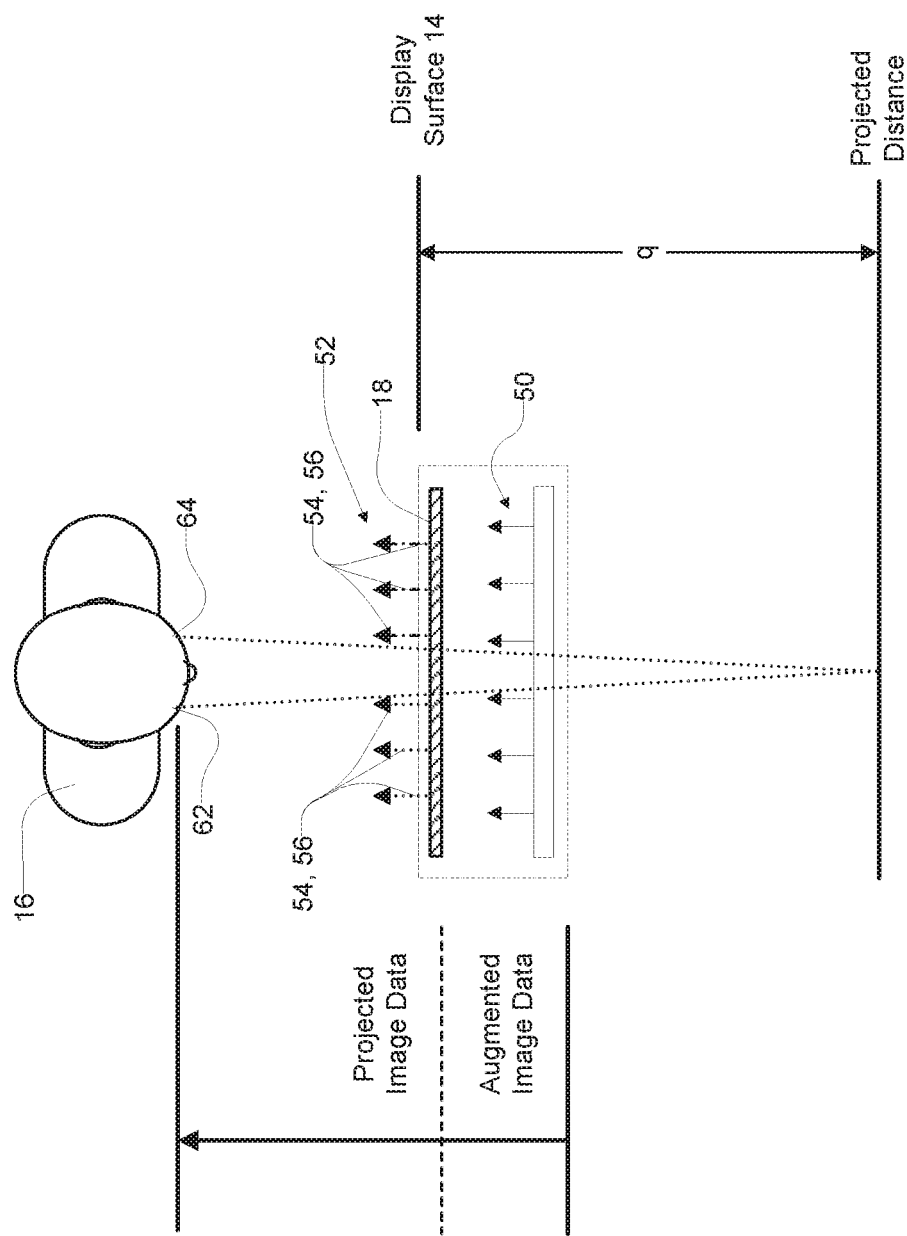
FIG. 7 is a schematic diagram of an image processing method for an occupant of a vehicle.

Referring now to FIGS. 6 and 7, diagrams of an image processing method that may be processed by the image processor are shown. The image processor may receive image data from one or more of the image sensors C1, C2, and C3 and encode or process the image data for demonstration on the display screen 14. For example, the first image sensor C1 may provide for a first view (VIEW 1), the second image sensor C2 may provide for a second view (VIEW 2), and the third image sensor C3 may provide for a third view (VIEW 3). The image views may be processed by the image processor, which may comprise each of the views being cropped, enhanced, stitched, and/or composited for display on the display screen 14 (42).

The image data received from the image processor may further be processed according to one or more augmentation or correction algorithms to generate augmented image data 50. In some embodiments, the augmented image data 50 may comprise a right image augmentation 44 and a left image augmentation 46. The augmentation or processing of the image data may comprise restructuring of various portions or segments of the image data to correct for a distortion of the lens apparatus 18 and/or facilitate lateral movement of the focal point of the eyes of the occupant 16. For example, the augmentation or processing of the image data may comprise parsing segments or portions of the image data such that the augmented image data has an appropriate amount of overlap to facilitate lateral movement of the focal point to facilitate the image data to be perceived at the projected distance q after being transmitted through the lens apparatus. The processing or augmentation may result in a grid-like restructuring or stretching of the image data in the vertical and horizontal display dimensions. In this way, display system 10 may provide the perception of the image data projected from the display screen 14 to appear as though it is originating from behind the display screen 14, while also correcting for a distortion caused by the projection.

The augmented image data 50 from the display screen 14 may be emitted from the display screen 14 into the lens apparatus 18. The image data may then be projected to the occupant 16 projected image data 52. In some embodiments, the projected image data 52 may comprise right image data 54 and left image data 56. In this way, the display apparatus 24 may be configured to display the image data within the passenger compartment 22 having an appearance of originating from the projected distance q. The projected distance q may vary based on the desired design and configuration of the display apparatus 24. For example, the projected distance q or the display distance may be about 125 mm to about 500 mm or more, and may be adjusted to greater than a meter. Additionally in some embodiments, the focal point of the lens apparatus 18 (or lens array) may be defined as being located at optical infinity. By providing the perception to the occupant 16 that the image data originates from the projected distance q, the display apparatus 24 may serve to limit or alleviate accommodation issues associated with viewing the nearby image data on the display screen 14 and objects located in the distant region 20.

As discussed herein, in some embodiments, the system 10 may be operable to generate image data for an autostereoscopic display. Referring now to FIGS. 6 and 7, the display apparatus 24 is shown projecting the right image data 54 and the left image data 56 in order to provide for independent correction of the augmented image data 50 for a right eye 62 and a left eye 64 of the occupant 16. The display system 10 may be configured to communicate right image data 54 to the right eye 62 and left image data 56 to the left eye 64. As discussed herein, the display apparatus 24 may correspond to an autostereoscopic display device configured to project the right image data 54 to the right eye 62 and the left image data 56 to the left eye 64. In this configuration, the display system 10 may communicate the image data to the occupant to provide the perception that the image data originates at the projected distance q.

Figure 8:
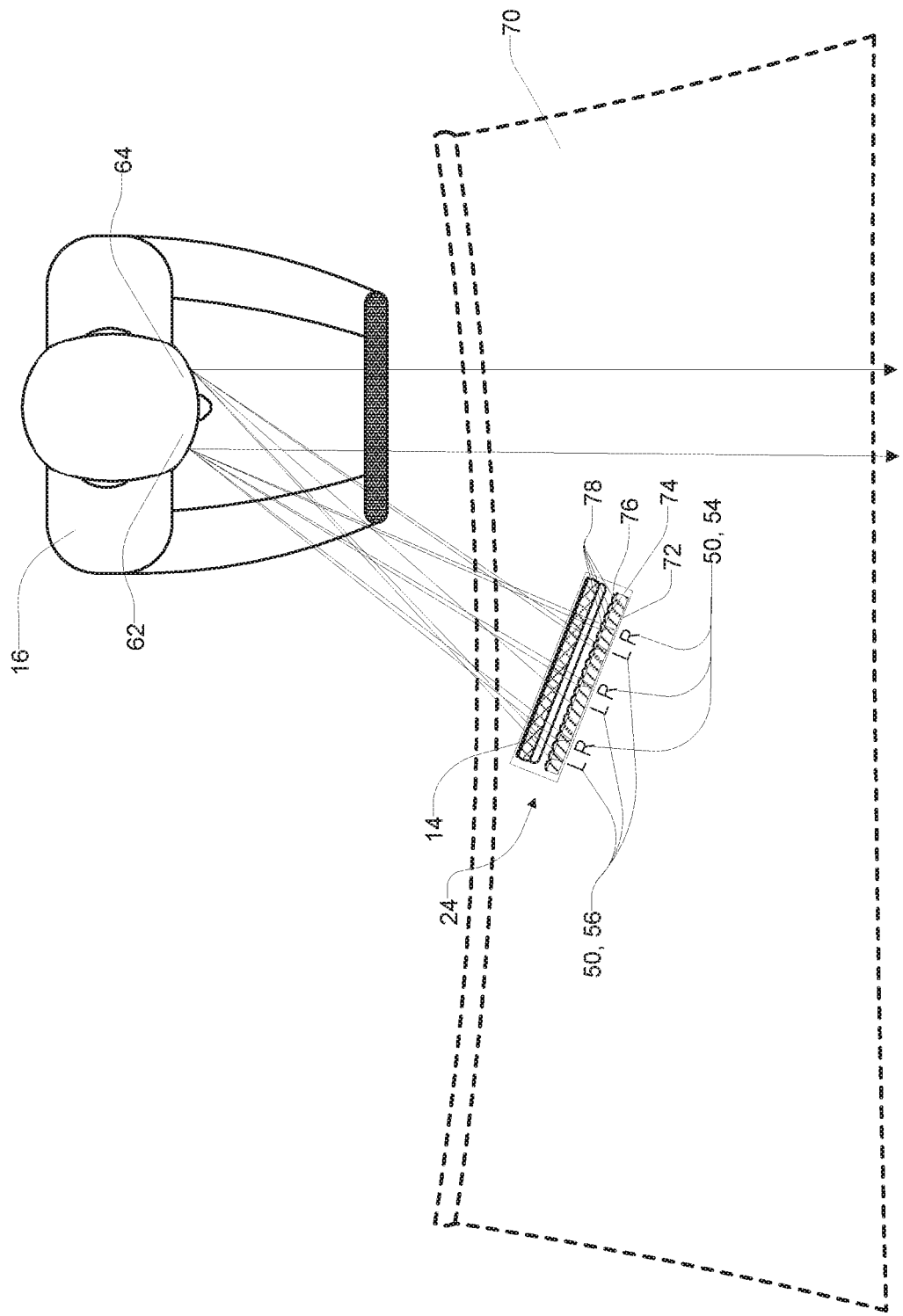
FIG. 8 is a top schematic view of a vehicle occupant viewing image data.

As shown in FIG. 8, the display apparatus 24 is shown in reference to a windshield 70 of the vehicle 12. To provide such functionality, the display apparatus 24 may comprise a display panel 72 corresponding to a pixel array 74 and a lenticular lens 76 formed on the display panel 72. A rear surface of the display screen 14 may face the lenticular lens 76. The display panel 72 may be a variety of display types having the pixel array 74, which may be arranged in rows and columns. For example, the display panel 72 may correspond to a liquid crystal display (LCD), a plasma display, an organic light emitting diode (OLED) display, a field emission display (FED) panel, or various other displays.

The lenticular lens 76 may comprise long cylindrical lens elements 78. The lens elements 78 may be arranged in parallel and be aligned with the columns of the pixel array 74. Accordingly, the lenticular lens 76 may be disposed over the display panel 72. The lenticular lens 76 may separate the right image data 54 from the left image data 56 based on a location of each pixel relative to the cylindrical elements 78. In this way, the display apparatus 24 may be configured to direct the right image data 54 to the right eye 62 and the left image data 56 to the left eye 64.

Figure 9:
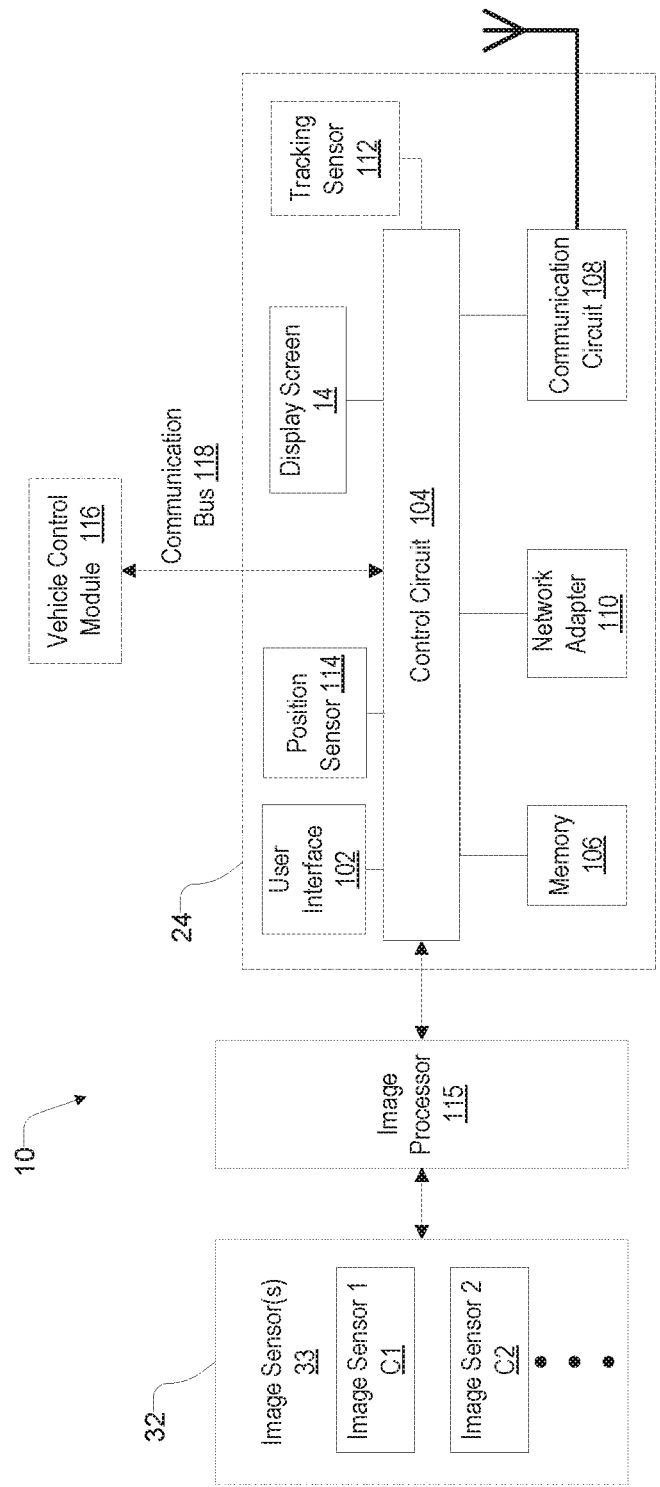
FIG. 9 is a block diagram of a display system in accordance with the disclosure.

Referring now to FIG. 9, a block diagram of the display system 10 is shown. The display system 10 may include a user interface 102 in the form of one or more buttons in communication with a control circuit 104. The user interface may provide for the display system 10 to receive one or more inputs to control operational settings, some of which are discussed herein. An exemplary embodiment of the display apparatus 24 may incorporate the elements shown in the dashed line box designated as the display apparatus 24. In some embodiments, the user interface 102 may include input devices such as touchscreen displays, switches, microphones, knobs, touch sensor (e.g., projected capacitance sensor resistance-based touch sensor, resistive touch sensor, or other touch sensor), proximity sensors (e.g., projected capacitance, infrared, ultrasound, infrared, or other proximity sensor), or other hardware configured to generate an input from a user action.

The display system 10 may comprise the display apparatus 24. The display apparatus 24 may comprise the display panel 72 comprising the pixel array 74 and a lenticular lens 76 proximate the display panel 72. The display panel 72 may be a variety of display types having the pixel array 74, which may be arranged in rows and columns. For example, the display panel 72 may correspond to a liquid crystal display (LCD), a plasma display, an organic light emitting diode (OLED) display, a field emission display (FED) panel, or various other displays. The display apparatus 24 may further incorporate a speaker, haptic feedback device (e.g., vibration motor), LEDs, or other hardware component for providing an output.

The control circuit 104 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 104 may be a system on a chip (SoC) individually or with additional hardware components described herein. The control circuit 104 may further include memory 106 (e.g., random access memory, read only memory, flash memory, hard disk storage, flash memory storage, solid state drive memory, etc.). In further embodiments, the control circuit 104 may function as a controller for one or more hardware components included in the display system 10. For example, the control circuit 104 may function as a controller for a touchscreen display or other operator input device, a controller for a transceiver, transmitter, receiver, or other communication device (e.g., implement a Bluetooth communications protocol).

In some embodiments, the control circuit 104 may be configured to receive inputs from the user interface 102. The inputs may be converted into control signals that may be identified and utilized to output one or more control signals and/or transmit data. In this configuration, the display system 10 may communicate (e.g. send and/or receive signals and/or data) to control various functions of the display or settings or functions of the vehicle 12.

The memory 106 may be used to facilitate the functions of the display system 10 as described herein. Memory 106 may include computer code modules, data, computer instructions, or other information which may be executed by the control circuit 104 or otherwise facilitate the functions of the display system 10 described herein. For example, memory 106 may include encryption codes, pairing information, identification information, a device registry configuration, image augmentation information, etc. The memory 106 and/or the control circuit 104 may facilitate the functions described herein using one or more programming techniques, data manipulation techniques, and/or processing techniques such as using algorithms, routines, lookup tables, arrays, searching, databases, comparisons, instructions, etc.

The display system 10 may further comprise a communication circuit 108. The communication circuit 108 may correspond to a transceiver circuit or transmitter circuit coupled to the control circuit 104. The transceiver circuit may provide for the display system 10 to transmit and/or receive wireless communication signals. The wireless communication signals may be transmitted to or received from a variety of wireless devices (e.g., an original transmitter, home electronic device, mobile communications device, and/or remote device). The communication circuit 108 may be controlled by the control circuit 104. For example, the control circuit 104 may turn on or off the communication circuit 108, the control circuit 104 may send data using the communication circuit 108, format information, an activation signal, control signal, and/or other signal or data for transmission via the communication circuit 108, or otherwise control the communication circuit 108. Inputs from the communication circuit 108 may also be received by the control circuit 104. For example, software configurations, updates, user settings and other information may be received by the communication circuit 108 and stored in the memory 106 by the control circuit 104.

The control circuit 104 may be also coupled to a network adapter 110, receivers, and/or transmitters. In some embodiments, the network adapter 110 may be configured to communicate with the image sensors 33. In some embodiments, the network adapter 110 may be or include a cellular transceiver. In this configuration, the display system 10 may use the network adapter 110 and/or an additional transceiver (e.g., a cellular transceiver) to access the internet, other networks, and/or network hardware. In some embodiments, the display system 10 may access the internet, other networks, and/or network hardware through an intermediate device in communication with the display system 10 such as the mobile device.

In an exemplary embodiment, the network adapter 110 may be configured to send/receive data and/or control signals to a mobile device. The network adapter 110 may communicate via various wireless communication protocols. For example, communication protocols may include but are not limited to Bluetooth™ (e.g., a Bluetooth low energy (BLE), Wi-Fi (IEEE 802.11), ZigBee, cellular, etc.), a wired interface and/or protocol (e.g., Ethernet, universal serial bus (USB), Firewire, etc.), or other communications connection (e.g. infrared, optical, ultrasound, etc.).

In some embodiments, the display system 10 may track a position of the occupant 16 or a viewer (e.g. a position of the eyes of the occupant 16) with the tracking sensor 112. The tracking sensor 112 may be implemented as an ultrasound sensor, an infrared sensor, a camera sensor/imager, a heat detector, etc. In general, the tracking sensor 112 may identify a position of the occupant 16 such that an image processor 115 may generate views of image data (e.g. the augmented image data) from the image sensors 33. The augmented image data 50 may correspond to views that appear to the occupant 16 as though they are projected at the projected distance q.

In some embodiments, the display system 10 may comprise a position sensor 114 configured to identify a position or orientation of the display apparatus 24 relative to a forward direction of the vehicle 12. The position sensor 114 may correspond to an electrical or electromechanical sensor (e.g. an encoder, potentiometer, proximity sensor, compass, gyroscope, etc.), and may be configured to identify an angle of the display apparatus 24 or the display screen 14 relative to the forward direction of the vehicle 12. In this way, the image processor 115 may be operable to process the image data to select a plurality of views to generate the image data based on the angle of the display screen 14.

The control circuit 104 may be in communication with a vehicle control module 116 via a communication bus 118 of the vehicle 12. The communication bus 118 may be configured to deliver signals to the control circuit 104 identifying various states of the vehicle 12. For example, the communication bus 118 may be configured to communicate an operating condition of the vehicle (e.g. the ignition is active, a gear selection, a lighting activation or setting, etc.), an ambient light level, a seat occupancy, a door ajar signal, driver/occupant identity or any other information or control signals that may be communicated via the communication bus 118. In this way, the control circuit 104 may communicate with the vehicle control module 116 to identify a variety of conditions and/or settings of the vehicle 12.

In some embodiments, the display system 10 may be incorporated to display similar to those disclosed in the following references. Examples of display assemblies that may be utilized with the disclosure may include U.S. Pat. No. 6,572,233 "REARVIEW MIRROR WITH DISPLAY," filed Sep. 18, 2000; U.S. Pat. No. 8,237,909 entitled "VEHICULAR REARVIEW MIRROR ASSEMBLY INCLUDING INTEGRATED BACKLIGHTING FOR A LIQUID CRYSTAL DISPLAY (LCD)," filed Feb. 6, 2009; U.S. Pat. No. 8,411,245 "MULTI-DISPLAY MIRROR SYSTEM AND METHOD FOR EXPANDED VIEW AROUND A VEHICLE," filed Sep. 30, 2009; and U.S. Pat. No. 8,339,526 "VEHICLE REARVIEW MIRROR ASSEMBLY INCLUDING A HIGH INTENSITY DISPLAY," filed Mar. 9, 2007, which are incorporated herein by reference in their entirety.

The following references may include various implementations for imager systems providing rearward facing panoramic views and are incorporated herein by reference in their entirety: U.S. Pat. No. 8,237,909 B2, "VEHICLE REARVIEW MIRROR ASSEMBLY INCLUDING INTEGRATED BACKLIGHTING FOR A LIQUID CRYSTAL DISPLAY (LCD)," filed Feb. 6, 2009; and U.S. Pat. No. 8,411,245 "MULTI-DISPLAY MIRROR SYSTEM AND METHOD FOR EXPANDED VIEW AROUND A VEHICLE," filed Sep. 30, 2009. Though the display system 10 in the various implementations disclosed herein is shown incorporated in a rearview display system, a display may similarly be incorporated in a vehicle forward center console, as a heads-up display, or in any other location that may be visible to an operator or occupant 16 of the vehicle 12.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A display apparatus for a vehicle for displaying images captured by at least one image sensor to a driver of the vehicle, the display apparatus comprising:
   a display screen configured to emit the images in an emission direction;
   a mirror apparatus configured to reflect the images from the display screen towards a viewing direction; and
   a lens apparatus configured to receive the images from the mirror, wherein the lens apparatus is configured to project the images to a focal distance substantially opposite the viewing direction; and
   a rearview assembly housing containing the display screen, the mirror apparatus, and the lens apparatus disposed therein, wherein:
   the focal distance is positioned at least about 750 mm from eyes of the driver, and
   the distance from the eyes of the driver to the lens apparatus is about 500 mm.

2. The display system according to claim 1, wherein the focal distance is positioned at least about 1.5 m from eyes of the driver.

3. The display system of claim 1, wherein the display apparatus corresponds to a rearview video display apparatus.

4. The display system according to claim 1, wherein the first lens apparatus has a focal length of about 115 mm.

5. The display system according to claim 1, and further comprising a second display screen configured to emit second images in a second emission direction.

6. The display system according to claim 5, wherein the first emission direction is the same as the second emission direction.

7. The display system according to claim 5, wherein the first emission direction is opposite the second emission direction.

8. The display system according to claim 1, wherein the optical path length from the display screen to the lens apparatus is substantially the same from each pixel of the display screen.

9. The display system of claim 1, wherein the lens apparatus comprises a neutral display region configured to display visual information that appears to be located on a plane formed by a surface of the lens apparatus.

10. The display system of claim 9, wherein the neutral display region is operable between:
- a first configuration where the visual information appears to be located on a plane formed by a surface of the lens apparatus; and
- a second configuration where the visual information appears to be located at the focal distance.

11. The display system of claim 9, further comprising a touchscreen user interface whereby the driver may interact with the visual information.

12. A display apparatus for a vehicle for displaying images captured by at least one image sensor to a driver of the vehicle, the display apparatus comprising:
- a first display screen configured to emit first images in a first emission direction;
- a second display screen configured to emit second images in a second emission direction;
- a mirror apparatus positioned to reflect the first and second images from the first and second display screens toward a viewing direction;
- a first lens apparatus configured to receive the first images from the mirror, wherein the first lens apparatus is configured to project the first images to a focal distance substantially opposite the viewing direction; and
- a second lens apparatus configured to receive the second images from the mirror, wherein the second lens apparatus is configured to project the second images to the focal distance substantially opposite the viewing direction.

13. The display system according to claim 12, wherein the focal distance is positioned at least about 750 mm from eyes of the driver and the distance from the eyes of the drive to the first and second lens apparatuses is about 500 mm.

14. The display system according to claim 12, wherein the first emission direction is the same as the second emission direction.

15. The display system according to claim 12, wherein the first emission direction is opposite the second emission direction.

16. The display system according to claim 12, wherein the first and second display screens are disposed in parallel planes.

17. The display system according to claim 12, wherein the mirror apparatus comprises a first mirror positioned to reflect the first images from the first display screen toward the viewing direction, and a second mirror positioned to reflect the second images from the second display screen toward the viewing direction.

18. The display system according to claim 12, wherein the optical path length from the display screens to the lens apparatus is substantially the same from each pixel of the display screens.

19. The display system of claim 12, wherein the image comprises right eye image data or frames and left eye image data or frames, wherein the right eye image data may be received by the right eye of the driver and the left eye image data may be received by the left eye of the driver.

20. A display apparatus for a vehicle for displaying images captured by at least one image sensor to a driver of the vehicle, the display apparatus comprising:
- a display screen configured to emit the images in an emission direction;
- a mirror apparatus positioned to reflect the images from the display screen towards a viewing direction; and
- a lens apparatus configured to receive the images from the mirror, wherein the lens apparatus is configured to project the images to a focal distance substantially opposite the viewing direction, wherein the focal distance is positioned at least about 115 mm from the lens apparatus;
- wherein the optical path length from the display screen to the lens apparatus is substantially the same from each pixel of the display screen.

* * * * *